United States Patent
Yuan et al.

(10) Patent No.: US 11,128,662 B2
(45) Date of Patent: Sep. 21, 2021

(54) METHOD, CLIENT, AND SERVER FOR PREVENTING WEB PAGE HIJACKING

(71) Applicant: TENCENT TECHNOLOGY (SHENZHEN) COMPANY LIMITED, Guangdong (CN)

(72) Inventors: Li Na Yuan, Shenzhen (CN); Xiao Long Zhang, Shenzhen (CN); Shaoyu Zhang, Shenzhen (CN); Yu Hui Hu, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 237 days.

(21) Appl. No.: 16/515,167

(22) Filed: Jul. 18, 2019

(65) Prior Publication Data

US 2019/0342334 A1 Nov. 7, 2019

Related U.S. Application Data

(63) Continuation of application No. PCT/CN2018/084647, filed on Apr. 26, 2018.

(30) Foreign Application Priority Data

May 31, 2017 (CN) .......................... 201710400446.7

(51) Int. Cl.
*H04L 29/06* (2006.01)
*G06F 16/93* (2019.01)
*G06F 16/955* (2019.01)

(52) U.S. Cl.
CPC .......... *H04L 63/1483* (2013.01); *G06F 16/93* (2019.01); *G06F 16/955* (2019.01);
(Continued)

(58) Field of Classification Search
CPC ............. H04L 63/1483; H04L 63/0236; H04L 63/1425; H04L 63/1433; H04L 63/1466;
(Continued)

(56) References Cited

U.S. PATENT DOCUMENTS 8,601,565 B1 * 12/2013 Sakata .................. G06F 21/606
726/11
9,438,610 B2    9/2016 Blanchfield et al.
(Continued)

FOREIGN PATENT DOCUMENTS

CN        102469113 A      5/2012
CN        103605926 A      2/2014
(Continued)

OTHER PUBLICATIONS

International Search Report of PCT/CN2018/084647 dated Jul. 20, 2018 [PCT/ISA/210].
(Continued)

*Primary Examiner* — Edward Zee
(74) *Attorney, Agent, or Firm* — Sughrue Mion, PLLC

(57) ABSTRACT

A method for preventing hijacking of a web page is provided. A HyperText Markup Language (HTML) source file is received from a web server in response to a HyperText Transfer Protocol (HTTP) access request, the HTML source file being embedded with a script tag corresponding to script code for preventing HTTP hijacking. The script code for preventing HTTP hijacking is pulled from an antihijacking server according to the script tag. It is detected, based on the script code for preventing HTTP hijacking, whether a document object model (DOM) node used for HTTP hijacking exists in a DOM tree. The DOM node used for HTTP hijacking is hidden from a web page of a browser in response to detecting that the DOM node used for HTTP hijacking.

10 Claims, 11 Drawing Sheets

(52) U.S. Cl.
CPC ...... *H04L 63/0236* (2013.01); *H04L 63/1425* (2013.01); *H04L 63/1433* (2013.01)

(58) Field of Classification Search
CPC ........ G06F 16/93; G06F 16/955; G06F 21/50; G06F 21/52; G06F 21/54; G06F 21/566
See application file for complete search history.

(56) References Cited

U.S. PATENT DOCUMENTS

2009/0138937 A1* 5/2009 Erlingsson .......... H04L 63/1416
726/1
2016/0337318 A1 11/2016 Blanchfield et al.

FOREIGN PATENT DOCUMENTS

| CN | 104348803 A | 2/2015 | |
|----|----|----|----|
| CN | 105164662 A | 12/2015 | |
| WO | WO-2016168428 A1 * | 10/2016 | ........... G06F 21/566 |

OTHER PUBLICATIONS

Written Opinion of the International Searching Authority for PCT/CN2018/084647 dated Jul. 20, 2018.
Communication dated Apr. 8, 2020 from the State Intellectual Property Office of the P.R.C. in Application No. 201710400446.7.
Communication dated Oct. 28, 2020 from the State Intellectual Property Office of the P.R.C. in Application No. 201710400446.7.

* cited by examiner

FIG. 7

METHOD, CLIENT, AND SERVER FOR PREVENTING WEB PAGE HIJACKING

CROSS-REFERENCE TO RELATED APPLICATION(S)

This application is a continuation application of International Application No. PCT/CN2018/084647, filed with the Chinese Patent Office on Apr. 26, 2018, which claims priority to Chinese Patent Application No. 201710400446.7, entitled "PROCESSING METHOD FOR PREVENTING WEB PAGE HIJACKING, CLIENT, AND SERVER" and filed with the China National Intellectual Property Administration on May 31, 2017, the disclosures of which are hereby incorporated herein by reference in their entireties.

FIELD

Example embodiments relate to the field of computer technologies, and in particular, to a technology for preventing hijacking of a web page.

DESCRIPTION OF THE RELATED ART

Various network attacks emerge with development of the Internet. In a hijacking manner using the HyperText Transfer Protocol (HTTP), some network operators tamper with web pages normally accessed by users, insert advertisements, or promote links. A web page whose HTTP is hijacked mainly suffers the following harms: 1) Experience of users while browsing the web pages is affected. 2) Content implanted in original web pages becomes uncontrollable, and vulgar advertisements implanted by operators affect a service brand image and a user reputation. 3) Services may be caused to be unavailable, and content implanted by operators may cause disordered page layouts, unavailable page interactions, and process exceptions. 4) A risk of information leakage exists, and all data interacted by a web front end and a web server has the leakage risk.

In the related art technology, to implement HTTP hijacking, the operators mainly need to perform the following operations:

1. Mark an HTTP connection. In many Transmission Control Protocol (TCP) connections, a connection whose application layer protocol is the HTTP is marked, and an HTTP response of the connection is waited for.

2. Tamper with the HTTP response. The HTTP response may be tampered with after a packet is obtained by using a gateway or a bypass device.

3. The packet obtained after being tampered with is sent to a user. For example, a common method is returning the packet first. The packet obtained after being tampered with is sent to the user before a real packet reaches the user, and the normal packet is discarded after reaching the user, so that the tampering is successful.

To confront the HTTP hijacking, a method for preventing HTTP hijacking used in the related art technology includes: the Hypertext Transfer Protocol Secure (HTTPS).

The HTTPS protects the HTTP plus the Transport Layer Security (TLS) Protocol. The HTTPS can prevent the HTTP hijacking, also can protect data from being leaked, and has an increasingly large proportion of use in the industry. In the related art technology, when the HTTPS is used, effective protection can be performed only when all stations use the HTTPS. As long as one point uses an insecure protocol, for example, the HyperText Markup Language (HTML), or the Cascading Style Sheets (CSS), or the network script JavaScript uses an insecure protocol, the HTTP may still be hijacked. Using the HTTPS can prevent tampering, and also can prevent information leakage. The standard is universal, and can be supported by most platforms.

The HTTPS used in the related art technology has at least the following defects: To use the HTTPS, a web server needs to perform complex upgrading, which reduces performance of the web server to different degrees. To use the HTTPS, a web page load time of a client may be prolonged, and even a phenomenon of blank web page display often occurs when web page loading fails because the network speed does not meet requirements.

SUMMARY

One or more example embodiments provide a method, a client, and a server for preventing hijacking of a web page, to display normal content in web pages.

According to an aspect of an example embodiment, there is provided a method for preventing hijacking of a web page is provided. A HyperText Markup Language (HTML) source file is received by a client from a web server in response to a HyperText Transfer Protocol (HTTP) access request, the HTML source file being embedded with a script tag corresponding to script code for preventing HTTP hijacking. The script code for preventing HTTP hijacking is pulled by the client from an antihijacking server according to the script tag. It is detected, by the client based on the script code for preventing HTTP hijacking, whether a document object model (DOM) node used for HTTP hijacking exists in a DOM tree. The DOM node used for HTTP hijacking is hidden from a web page of a browser in response to detecting that the DOM node used for HTTP hijacking.

According to another aspect of an example embodiment, there is provided a method for preventing hijacking of a web page. A script tag that corresponds to script code for preventing HTTP hijacking is received by an antihijacking server from a client, the script tag being embedded in an HTML source file. The script code for preventing HTTP hijacking is obtained by the antihijacking server based on the script tag. The script code for preventing HTTP hijacking to the client is provided by the antihijacking server.

According to another aspect of an example embodiment, there is provided a client, including: at least one memory operable to store program code; and at least one processor operable to read the program code and operate as instructed by the program code. The program code includes: receiving code configured to cause the at least one processor to receive an HTML source file from a web server in response to a HyperText Transfer Protocol (HTTP) access request, the HTML source file being embedded with a script tag corresponding to script code for preventing HTTP hijacking; pulling code configured to cause the at least one processor to pull the script code for preventing HTTP hijacking from an antihijacking server according to the script tag; detection code configured to cause the at least one processor to detect, based on the script code for preventing HTTP hijacking, whether a DOM node used for HTTP hijacking exists in a DOM tree; and striking processing code configured to cause the at least one processor to hide the DOM node used for HTTP hijacking from a web page of a browser in response to detecting that the DOM node used for HTTP hijacking exists.

According to an aspect of an example embodiment, there is provided an antihijacking server, including: at least one memory operable to store program code; and at least one processor operable to read the program code and operate as instructed by the program code to perform: receiving, from a client, a script tag that corresponds to script code for preventing HTTP hijacking, the script tag being embedded in an HTML source file; obtaining, based on the script tag, the script code for preventing HTTP hijacking; and providing the script code for preventing HTTP hijacking to the client.

According to an aspect of an example embodiment, there is provided a terminal device, including: at least one memory operable to store program code; and at least one processor operable to read the program code and operate as instructed by the program code to perform: receiving a HyperText Markup Language (HTML) source file from a web server in response to a HyperText Transfer Protocol (HTTP) access request, the HTML source file being embedded with a script tag corresponding to script code for preventing HTTP hijacking; pulling the script code for preventing HTTP hijacking from an antihijacking server according to the script tag; detecting, based on the script code for preventing HTTP hijacking, whether a document object model (DOM) node used for HTTP hijacking exists in a DOM tree; and hiding the DOM node used for HTTP hijacking from a web page of a browser in response to detecting that the DOM node used for HTTP hijacking.

According to an aspect of an example embodiment, there is provided a non-transitory storage medium, storing program code that is executed by at least one processor to perform: receiving a HyperText Markup Language (HTML) source file from a web server in response to a HyperText Transfer Protocol (HTTP) access request, the HTML source file being embedded with a script tag corresponding to script code for preventing HTTP hijacking; pulling the script code for preventing HTTP hijacking from an antihijacking server according to the script tag; detecting, based on the script code for preventing HTTP hijacking, whether a document object model (DOM) node used for HTTP hijacking exists in a DOM tree; and hiding the DOM node used for HTTP hijacking from a web page of a browser in response to detecting that the DOM node used for HTTP hijacking.

BRIEF DESCRIPTION OF THE DRAWINGS

These and/or other aspects will become apparent and more readily appreciated from the following description of the embodiments, taken in conjunction with the accompanying drawing.

FIG. 7 is a schematic diagram of an application scenario of a JS for preventing HTTP hijacking embedded in web Hypertext Markup Language (HTML) source code according to an embodiment.

DETAILED DESCRIPTION

The example embodiments provide a method, a client, and a server for preventing hijacking of a web page, thereby displaying normal content in web pages.

The terms "first", "second", "third", "fourth", and the like (if exists) in the specification and the claims of the disclosure and the foregoing accompanying drawings are used for distinguishing similar objects, and do not need to be used for describing a particular sequence or order. It should be understood that data and operation are interchangeable in a suitable case, so that the embodiments of the disclosure described herein can be implemented in a sequence alternative to or in addition to the sequence shown or described herein. In addition, the terms "include", "comprise", and any variants thereof are intended to cover a non-exclusive inclusion. For example, a process, method, system, product, or device that includes a series of operations or elements is not limited to the operations or units that are clearly listed, but may include other operations or units that are not clearly listed or that are inherent to the process, method, product, or device.

The term "a module" and/or "a unit" used in the disclosure is for referring to elements performing at least one function or operation, and these elements may be implemented as hardware or software, or as a combination of hardware and software. Further, a plurality of "modules" or "units" may be integrated into at least one module and implemented as at least one processor, except "modules" or "unit" that need to be implemented as specific hardware.

An example embodiment of a method for preventing hijacking of a web page in the disclosure may be applied to a system for preventing hijacking of a web page.

Figure 1:
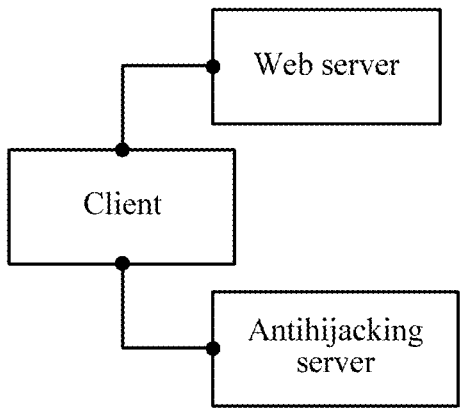
FIG. 1 is a schematic diagram of a composition structure of a system for preventing web page hijacking according to an embodiment.

Referring to FIG. 1, the system for preventing web page hijacking provided in an embodiment may include: a client, an antihijacking server, and a web server. In this embodiment, HTTP hijacking may be prevented based on a Hypertext Markup Language (HTML) document object model (DOM) event. For a manner of tampering with HTTP packet returning by an operator, web page changes are listened to. If an illegal Uniform Resource Locator (URL) is referenced to a web page, the HTTP of the web page is hijacked, and display of a hijacked part of the web page is hidden. For example, if a part of content in the web page is hijacked, the part may be inserted with illegal content such as advertisements. In this embodiment, when page loading is completed, DOM nodes of a DOM tree are traversed all at once, all illegal URLs are filtered out, and display of illegal DOM nodes are hidden and striking processing is performed. Page changes are listened to, and dynamically inserted DOM nodes or DOM node attributes are detected and stricken. The method for preventing web page hijacking provided in this embodiment needs no participation of users, and has smooth user experience.

Figure 2:
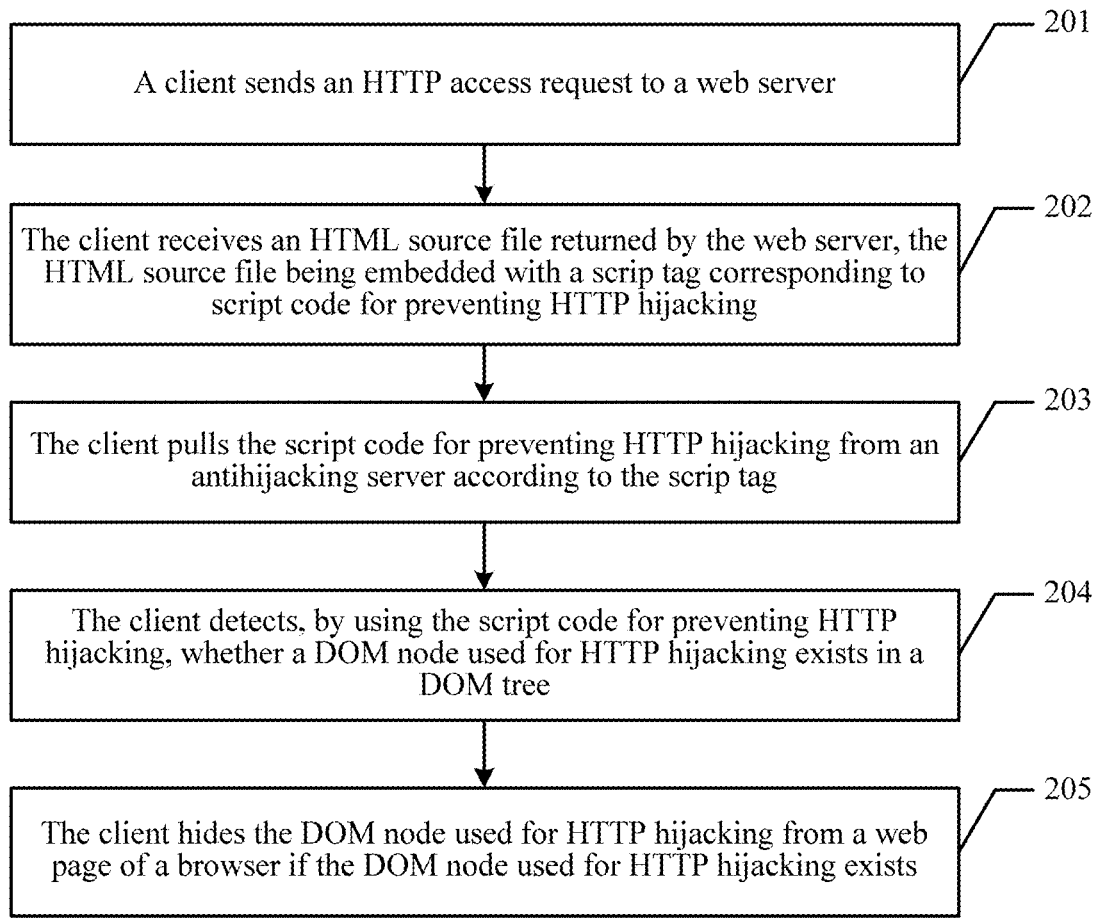
FIG. 2 is a schematic block flowchart of a method for preventing web page hijacking according to an embodiment.

First, the method for preventing web page hijacking provided in this embodiment is described from the perspective of a client. Referring to FIG. 2, the method mainly includes the following operations 201-205:

201. A client sends an HTTP access request to a web server.

In this embodiment, the client is a web client mounted with a browser. A Transmission Control Protocol (TCP) connection may be established between the client and the web server. When the client is to access a website, the client sends an HTTP access request to the web server.

202. The client receives an HTML source file returned by the web server, the HTML source file being embedded with a script tag corresponding to script code for preventing HTTP hijacking.

In this embodiment, the web server inserts a script tag corresponding to the script code for preventing HTTP hijacking into the HTML source file. The HTML source file is stored in the web server, and executed in the web client. For example, a script tag corresponding to the script code for preventing HTTP hijacking, for example, a script sentence: <script type="text/javascript"src="HTTPs://aq.qq.com/v2/hijack/aq_dw_ob.js?v=1.1"></script>, is embedded into HTML source code.

203. The client pulls the script code for preventing HTTP hijacking from an antihijacking server according to the script tag.

In this embodiment, after receiving an HTML source file, a client loads the HTML source file, to obtain a script tag corresponding to script code for preventing HTTP hijacking embedded in the HTML source file. A communication link is established between the client and an antihijacking server. The client may send the script tag embedded in the HTML source file to the antihijacking server, so that the antihijacking server obtains the corresponding script code for preventing HTTP hijacking according to the script tag, that is, the client may pull the script code for preventing HTTP hijacking from the antihijacking server. The antihijacking server stores the script code for preventing HTTP hijacking. The script code for preventing HTTP hijacking is stored in the antihijacking server, and the client obtains the script code for preventing HTTP hijacking and then runs the script code in a browser.

In some embodiments, the script code for preventing HTTP hijacking further includes: an indication message used for indicating whether to strike the HTTP hijacking. In some embodiments, the script code for preventing HTTP hijacking further includes: a website whitelist. In this embodiment, some parameters, for example, whether to set a website whitelist or whether to perform striking, may be further set by using the script code for preventing HTTP hijacking. For example, the script code for preventing HTTP hijacking may include:

```
var whiteDOMain = /^www\.163\.com$/i;
AQHijackReport.init({
  whiteReg: whiteDOMain, //set a whitelist
  antiHijack:true //whether to perform hidden striking when hijacked
``` where the whiteReg and the antiHijack are non-essential parameters, may be specifically configured or not according to application scenario configurations, and may be configured flexibly by setting a website whitelist and whether to perform striking.

204. The client detects, by using the script code for preventing HTTP hijacking, whether a DOM node used for HTTP hijacking exists in a DOM tree.

In this embodiment, the DOM tree is created in the client. DOM is a standard programming interface for processing an extensible markup language. The client loads the script code for preventing HTTP hijacking in the web page of the browser, to determine whether the DOM node used for HTTP hijacking exists in all DOM nodes of the DOM tree.

In some embodiments, that the client detects, by using the script code for preventing HTTP hijacking, whether a DOM node used for HTTP hijacking exists in a DOM tree in operation 204 includes:

A1. The client loads the HTML source file in the web page of the browser.

A2. The client listens to the following DOM events by using the browser: a DOM node load completion event, a dynamic DOM node inserted event, and a dynamic DOM node attribute modified event.

A3. The client determines, according to results of listening to the DOM events, whether DOM nodes in the DOM tree match a URL matching rule configured by the script code for preventing HTTP hijacking.

A4. The client determines a DOM node that does not match the URL matching rule as the DOM node used for HTTP hijacking.

The browser of the client loads the HTML source file, and the client listens to a DOM node load completion event (e.g., DOMContentLoaded), dynamic DOM node inserted event (e.g., DOMNodeInserted), and a dynamic DOM node attribute modified event (e.g., DOMAttrModified event) of the HTML by using the script code for preventing HTTP hijacking. Illegal URLs may be filtered out by using the URL matching rule configured by the script code for preventing HTTP hijacking, and DOM nodes with the illegal URLs are hidden. The URL matching rule may be configured according to a resource storage address of the web server, and the URL matching rule may be specifically a regular expression of a legal domain name provided by the web server. The URL matching rule may be used to filter out the illegal URLs.

Further, in some embodiments, the script code for preventing HTTP hijacking further includes: a website whitelist.

In this implementation scenario, operation A3 in which the client determines, according to results of listening to the DOM events, whether DOM nodes in the DOM tree match a URL matching rule configured by the script code for preventing HTTP hijacking in may be operation A31 as follows:

A31. The client determines whether URLs included in all DOM nodes in the DOM tree match the URL matching rule configured by the script code for preventing HTTP hijacking, and determines whether the URLs included in all DOM nodes belong to the website whitelist.

In the implementation scenario in which the foregoing operation A31 is performed, operation A4 in which the client determines a DOM node that does not match the URL matching rule as the DOM node used for HTTP hijacking may be operation A1 as follows:

A41. The client determines a DOM node whose URL does not match the URL matching rule and does not belong to the website whitelist as the DOM node used for HTTP hijacking.

URLs in the website whitelist set in a service party are certainly legal, but legal URLs are unnecessarily in the whitelist set by the service party. The legal URLs are a collection of URLs set in the script code for preventing HTTP hijacking and URLs in the website whitelist. Therefore, a DOM node whose URL does not match the URL matching rule and does not belong to the website whitelist is the DOM node used for HTTP hijacking.

205. The client hides the DOM node used for HTTP hijacking from a web page of a browser if the DOM node used for HTTP hijacking exists.

In this embodiment, as can be learned from the determining of the foregoing operation 204, if the DOM node used for HTTP hijacking exists in the DOM tree, the client hides the DOM node used for HTTP hijacking from the web page of the browser. Through hidden striking on the DOM, the web page of the browser does not display content whose HTTP is hijacked, and only displays content provided by the web server.

In some embodiments, the script code for preventing HTTP hijacking further includes: an indication message used for indicating whether to strike the HTTP hijacking. In this implementation scenario, operation 205 in which the client hides the DOM node used for HTTP hijacking from a web page of a browser if the DOM node used for HTTP hijacking exists may be operation B1 as follows:

B1. The client determines, in the script code for preventing HTTP hijacking, whether HTTP hijacking needs to be stricken.

B2. The client hides the DOM node used for HTTP hijacking from the web page of the browser when the indication message indicates that the HTTP hijacking needs to be stricken.

Whether the client performs hidden striking on the DOM node used for HTTP hijacking depends on a specific configuration of the script code for preventing HTTP hijacking. When the indication message indicates that the HTTP hijacking does not need to be stricken, the client may not perform any processing on the DOM node used for HTTP hijacking.

In some embodiments, in addition to performing the foregoing embodiments, the method for preventing web page hijacking provided in this embodiment further includes:

C1. The client reports hijacking information to the antihijacking server if the DOM node used for HTTP hijacking exists.

After operation 204 is performed, in addition to performing operation 205, the client reports the hijacking information to the antihijacking server if the DOM node used for HTTP hijacking exists. The hijacking information is information carried in the DOM node used for HTTP hijacking. For example, the client reports the hijacking information to the antihijacking server through a Common Gateway Interface (CGI), and after receiving the reported data, the CGI in the antihijacking server performs database input processing, to facilitate query and analysis of all parties, to continuously improve the stored script code for preventing HTTP hijacking.

As can be learned from the examples by using the foregoing embodiments, a client first sends an HTTP access request to a web server, and the client receives an HTML source file returned by the web server, the HTML source file being embedded with a script tag corresponding to script code for preventing HTTP hijacking; the client then pulls the script code for preventing HTTP hijacking from an antihijacking server according to the script tag; the client detects, by using the script code for preventing HTTP hijacking, whether a DOM node used for HTTP hijacking exists in a DOM tree; and the client hides the DOM node used for HTTP hijacking from a web page of a browser if the DOM node used for HTTP hijacking exists. In the embodiments, when page loading is completed, DOM nodes in the DOM tree may be traversed, and a DOM node used for HTTP hijacking is hidden, thereby displaying normal content in web page, and preventing web page hijacking.

Figure 3:
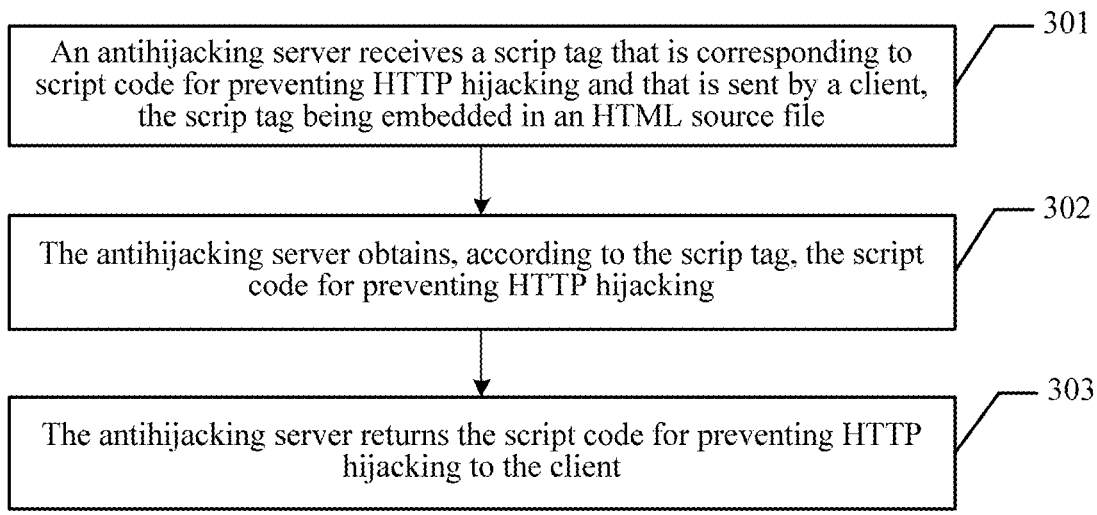
FIG. 3 is a schematic block flowchart of a method for preventing web page hijacking according to an embodiment.

The method of the embodiments is described from the perspective of a client in the foregoing embodiment. Hereinafter, description is made from the perspective of an antihijacking server. Referring to FIG. 3, the method provided in this embodiment of the disclosure may include the following operations:

301. An antihijacking server receives a script tag that corresponds to script code for preventing HTTP hijacking and that is sent by a client, the script tag being embedded in an HTML source file.

After receiving the HTML source file sent by the web server, the client obtains the script tag corresponding to the script code for preventing HTTP hijacking embedded in the HTML source file, and sends the script tag to the antihijacking server.

302. The antihijacking server obtains, according to the script tag, the script code for preventing HTTP hijacking.

After obtaining the script tag sent by the client, the antihijacking server uses a correspondence between the stored script tag and the script code for preventing HTTP hijacking, to obtain the script code for preventing HTTP hijacking corresponding to the script tag. The script code for preventing HTTP hijacking is also stored in the antihijacking server.

303. The antihijacking server returns the script code for preventing HTTP hijacking to the client.

After obtaining, according to the script tag sent by the client, the corresponding script code for preventing HTTP hijacking, the antihijacking server sends the script code for preventing HTTP hijacking to the client, and the client obtains the script code for preventing HTTP hijacking and then runs the script code in a browser.

In some embodiments, after the antihijacking server returns the script code for preventing HTTP hijacking to the client in operation 303, the method provided in this embodiment further includes:

D1. The antihijacking server receives hijacking information sent when the client detects the DOM node used for HTTP hijacking, and stores the hijacking information to a database.

After detecting the DOM node used for HTTP hijacking, the client may further use information related to the DOM node used for HTTP hijacking as hijacking information to be sent to the antihijacking server, and further, the antihijacking server may store the hijacking information to the database. During specific implementation, the client may report the hijacking information to the antihijacking server through a CGI, and after receiving the reported data, the CGI in the antihijacking server performs database input processing, to facilitate query and analysis of all parties, to continuously improve the stored script code for preventing HTTP hijacking.

In some embodiments, in addition to performing the foregoing embodiments, the method for preventing web page hijacking provided in this embodiment further includes:

E1. The antihijacking server sets a website whitelist in the script code for preventing HTTP hijacking; and/or E2. The antihijacking server sets, in the script code for preventing HTTP hijacking, an indication message used for indicating whether to strike HTTP hijacking.

The script code for preventing HTTP hijacking further includes: an indication message used for indicating whether to strike the HTTP hijacking. In some embodiments, the script code for preventing HTTP hijacking further includes: a website whitelist. In this embodiment, some parameters, for example, whether to set a website whitelist or whether to perform striking, may be further set by using the script code for preventing HTTP hijacking. For example, the script code for preventing HTTP hijacking may include:

```
var whiteDOMain = /^www\.163\.com$/i;
AQHijackReport.init({
    whiteReg: whiteDOMain, //set whitelist
    antiHijack:true //whether to perform hidden striking when hijacked
``` where the whiteReg and the antiHijack are non-essential parameters, may be specifically configured or not according to application scenario configurations, and may be configured flexibly by setting a website whitelist and whether to perform striking.

As can be learned from the examples by using the foregoing embodiments, a client pulls, according to a script tag embedded in an HTML source file, script code for preventing HTTP hijacking corresponding to the script tag from an antihijacking server, and the antihijacking server may provide the script code for preventing HTTP hijacking to the client, so that when page loading is completed, the client may traverse DOM nodes in a DOM tree, and hide a DOM node used for HTTP hijacking, thereby displaying normal content in web pages, and preventing web page hijacking.

Figure 4:
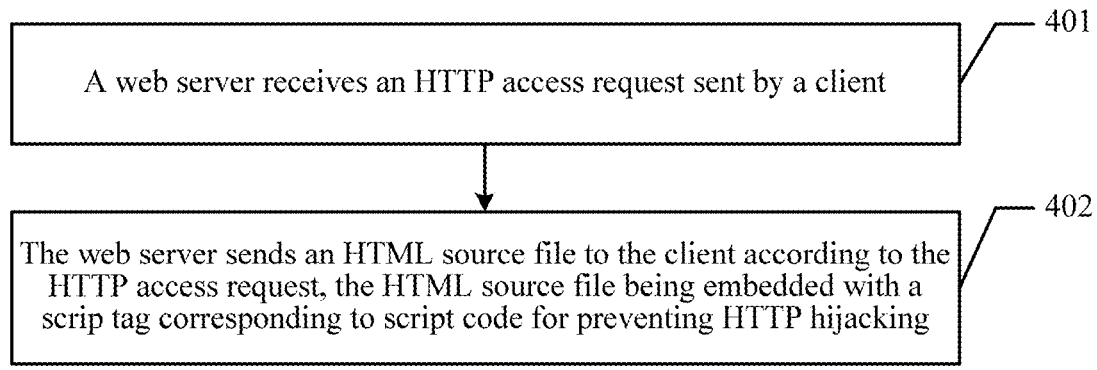
FIG. 4 is a schematic block flowchart of a method for preventing web page hijacking according to an embodiment.

The above descriptions are made from the perspective of a client and from the perspective of an antihijacking server respectively in the foregoing embodiments. Hereinafter, description is made from the perspective of a web server next. Referring to FIG. 4, the method provided in this embodiment of the disclosure may include the following operations 401-402:

401. A web server receives an HTTP access request sent by a client.

In this embodiment, when the client needs to access a website, the client sends an HTTP access request to a web server, and the web server receives the HTTP access request.

In some embodiments, before the web server receives the HTTP access request sent by the client in operation 401, the method provided in this embodiment further includes:

F1. The web server inserts script tags corresponding to script code for preventing HTTP hijacking into an HTML source file.

In this embodiment, the web server inserts a script tag corresponding to the script code for preventing HTTP hijacking into the HTML source file. The HTML source file is stored in the web server, and executed in a web client. For example, a script tag corresponding to the script code for preventing HTTP hijacking, for example, a script sentence: <script type="text/javascript"src="HTTPs://aq.qq.com/v2/hijack/aq_dw_ob.js?v=1.1"></script>, is embedded into HTML source code.

402. The web server sends an HTML source file to the client according to the HTTP access request, the HTML source file being embedded with a script tag corresponding to script code for preventing HTTP hijacking.

In this embodiment, the web server pre-stores the HTML source file embedded with the script tag corresponding to the script code for preventing HTTP hijacking. The web server responds to the access request of the client, and returns the HTML source file embedded with the script tag corresponding to the script code for preventing HTTP hijacking to the client.

As can be learned from the examples by using the foregoing embodiments, a client first sends an HTTP access request to a web server, and the client receives an HTML source file returned by the web server, the HTML source file being embedded with a script tag corresponding to script code for preventing HTTP hijacking. In this embodiment, the web server sends the HTML source file embedded with the script tag corresponding to the script code for preventing HTTP hijacking to the client, so that the client may obtain the corresponding script code for preventing HTTP hijacking from an antihijacking server according to the script tag. When page loading is completed, the client may use the script code for preventing HTTP hijacking to traverse DOM nodes in a DOM tree, and hide a DOM node used for HTTP hijacking, thereby displaying normal content on web pages, and preventing web page hijacking.

For better understanding and implementation of the foregoing solutions of the embodiments, specific descriptions are provided below by using examples of corresponding application scenarios.

Figure 5:
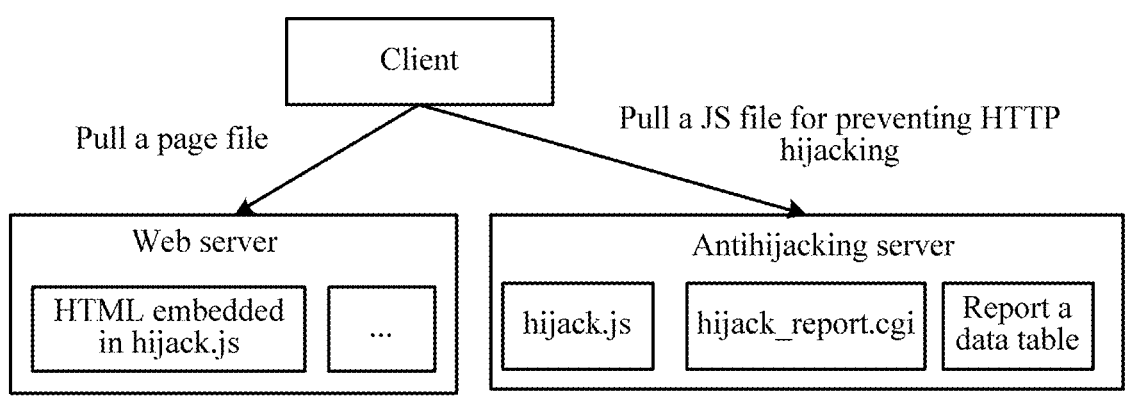
FIG. 5 is a schematic diagram of an application scenario of a system for preventing web page hijacking according to an embodiment.

FIG. 5 is a schematic diagram of an application scenario of a system for preventing web page hijacking according to an embodiment. The technical solution mainly involves three modules: a client, a web server (e.g., a WebServer of an ordinary website), and an antihijacking server. The web server provides an Internet service, and the antihijacking server may provide a special service for preventing HTTP hijacking.

A PC/mobile browser module is disposed in the client, and the client pulls an HTML source file embedded with a script tag corresponding to script code for preventing HTTP hijacking. The script code for preventing HTTP hijacking is a JS (named hijack.js) for preventing HTTP hijacking. The HTML source file embedded with the script tag corresponding to the script code for preventing HTTP hijacking is stored in the WebServer of the ordinary website, and the JS for preventing HTTP hijacking is stored in the antihijacking server, but both of the HTML source file and the JS for preventing HTTP hijacking are run in the browser module. During running, the JS for preventing HTTP hijacking detects static and/or dynamic DOM tree nodes, and determines, according to a rule, whether to hijack the HTTP, to perform striking and report data.

As an access party of the solution, the WebServer of the ordinary website needs to modify the HTML source file only, and add a script tag corresponding to the JS for preventing HTTP hijacking: <script type="text/javascript" src="HTTPs://aq.qq.com/v2/hijack/hijack.js?v=1.1"></script>. The JS also supports some personalized custom actions, which are shown below during use.

```
var whiteDomain = / www\.163\.com$/i;
    AQHijackReport.init({
        whiteReg: whiteDomain, //set a whitelist, and this is a non-
essential parameter
            antiHijack:true //whether to perform hidden striking when
hijacked, and this is a non-essential parameter
        });
``` where the whiteReg parameter represents a whitelist website URL domain name, that is, website URLs matching default domain names or regular expressions are all regarded as normal URLs, the antiHijack represents whether to perform striking when it is detected that the HTTP is hijacked, and the striking means that display is mainly hidden, and the antiHijack is a Boolean variable whose value is true or false.

The antihijacking server receives a DOM node type used for HTTP hijacking and a CGI file hijack_report.cgiil of a legal URL that are reported by a browser, and stores the DOM node type used for HTTP hijacking and the CGI file of the illegal URL to the antihijacking server. After receiving the reported data, the antihijacking server performs database input processing, to facilitate query and analysis of all parties, to improve this solution. The CGI is deployed in the antihijacking server, a program is run at an antihijacking server end, and the browser accesses the CGI, and submits hijacking information to the CGI.

Figure 6:
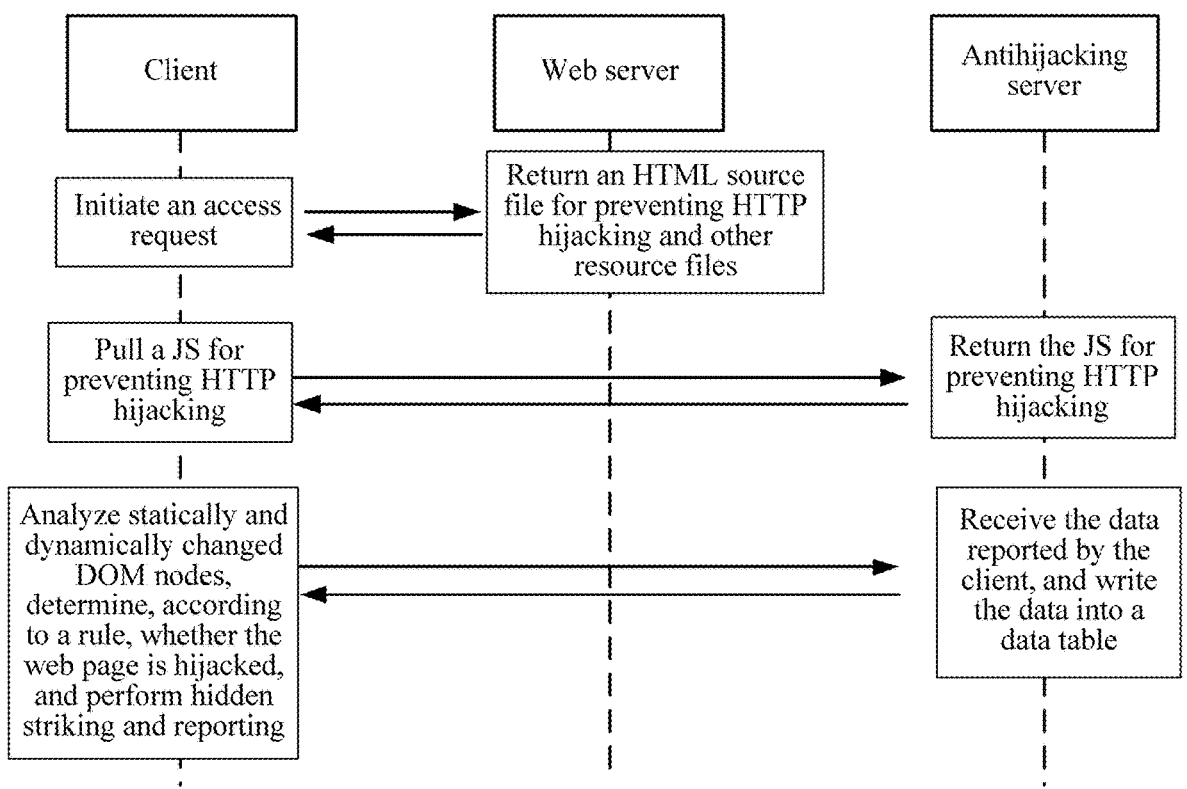
FIG. 6 is a schematic diagram of an interactive process between network elements in a system for preventing web page hijacking according to an embodiment.

FIG. 6 is a schematic diagram of an interactive process between network elements in a system for preventing web page hijacking according to an embodiment. The following processes are mainly included:

Operation 1. A user uses a browser of a personal computer or a mobile phone to normally access a website, and a client sends an HTTP access request.

Operation 2. A web server returns an HTML source file embedded with a script tag corresponding to script code for preventing HTTP hijacking and other resource files. The other source files are resources such as Cascading Style Sheets (CSS), images, JS, fonts. The browser of the client loads the HTML source file embedded with the script tag corresponding to script code for preventing HTTP hijacking and the other resource files.

Operation 3. Because the HTML source file is embedded with the script tag corresponding to the script code for preventing HTTP hijacking, the browser may use the anti-hijacking serve to pull the script code for preventing HTTP hijacking, that is, a JS for preventing HTTP hijacking.

Operation 4. The JS for preventing HTTP hijacking runs in the browser of the client, analyzes statically and/or dynamically changed DOM nodes, determines, according to a URL matching rule, whether the web page is hijacked, and performs hidden striking and reporting. After receiving the reported data, the CGI in the antihijacking server performs database input processing and directly stores the reported data to a database, to facilitate query and analysis of all parties, to continuously improve this solution.

Figure 7:
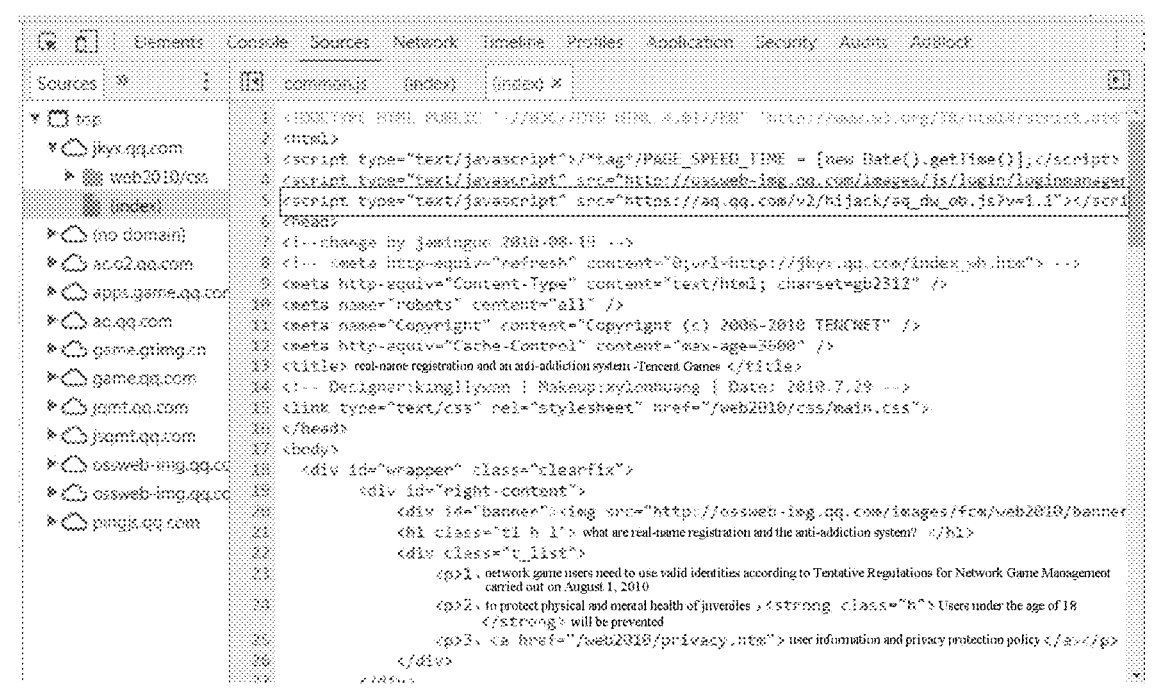

Real-name registration and an anti-addiction system website (HTTP://jkyx.qq.com/) are used as examples. The web page is connected to the solution provided in the disclosure, and the website is connected to a JS system for preventing HTTP hijacking, that is, a script tag corresponding to the JS for preventing HTTP hijacking is embedded in HTML source code. The HTML source file is stored in the web server, and executed in a web client (browser end). The script tag corresponding to the JS for preventing HTTP hijacking is: <script type="text/javascript" src="HTTPs://aq.qq.com/v2/hijack/aq_dw_obj.s?v=1.1"></script>, so that the client may load the JS for preventing HTTP hijacking. An application party may also set some parameters, such as whether to set a website whitelist and whether to perform striking. FIG. 7 is a schematic diagram of an application scenario of a JS for preventing HTTP hijacking embedded in HTML source code of a website according to an embodiment.

When the HTTP is hijacked, the JS for preventing HTTP hijacking performs hidden striking on a DOM used for HTTP hijacking (for example, an advertising DOM node), that is, hides the advertising DOM node in the web page of the client, does not display corresponding content, and reports an illegal URL to a background for preventing HTTP hijacking, such as an antihijacking server.

The background for preventing HTTP hijacking stores the reported data to a data table, to facilitate query and analysis of all parties, to improve this solution.

Next, algorithms for determining HTTP hijacking and striking HTTP hijacking in this embodiment are described by using examples, and mainly include the following code:

```
document.addEventListener("DOMContentLoaded", function(e) {
            checkNonTxDOMain(101, e);//after page loading is
completed, traverse DOM nodes, and a DOM tree is generated at a
browser end
        }, false);
    window.addEventListener('DOMNodeInserted', function(e) {
            checkNonTxDOMain(101, e);//when dynamically
generated DOM nodes are inserted, traverse the DOM nodes
        }, false);
    window.addEventListener('DOMAttrModified', function(e) {
            checkNonTxDOMain(101, e);;//when a DOM node
attribute is modified dynamically, check the node attribute
    }, false);
    checkNonTxDOMain(appid, e)definition of the function is as follows
    function checkNonTxDOMain(appid, e) { //assign an appid for each
access network
        var checkInfo = {appid: appid, childURL: "", parentURL: "" };
            try {
                checkInfo.childURL = location.href; //collection the
current page and a parent page URL
                checkInfo.parentURL = parent.location.href;
            } catch (ign) {
                checkInfo.parentURL = _doc.referrer; //it may be
cross-domain when an exception occurs
            }
            if (e && e.type && (e.type == "DOMNodeInserted"||
e.type == "DOMAttrModified")) {
                var DOM = e.srcElement;
                if (!DOM || !DOM.outerHTML) { return; /*e is not
a DOM, but an inserted text */ }
                try {
                    generateNonTxDOMainFromDOM(DOM,
'insert', checkInfo); //main logic is in a change function
                } catch (e) { }
            } else {
        try {
        generateNonTxDOMainFromDOM(document, 'current', checkInfo);
(parent!=window)?generateNonTxDOMainFromDOM(parent.document,
'parent', checkInfo) : false;
            } catch (ign) { }
        }
    }
```

Next, the generateNonTx DOMainFrom DOM(appid, e) function is used as an example for description. According to DOM node types, URLs in different attributes may be matched, and mainly include the following code:

```
    function generateNonTxDOMainFromDOM(DOM, parentMark, checkInfo) {
            var nodeList = [DOM];
         var collection = DOM.getElementsByTagName('*'); //obtain all DOM nodes
         var urlLists = [ ];
         for (var i = 0; i < collection .length; i++) {
             var node = collection [i];
            if (node.nodeName.toUpperCase( ) == 'SCRIPT') {
                  urlLists = urlLists.concat(extractScriptSrc(node)); //match .src attribute in script tags in the HTML
                  urlLists = urlLists.concat(extractScriptInnerHtml(node)); //match script.innerHTML
             } else if (node.nodeName.toUpperCase( ) == 'IFRAME') {
                 urlLists = urlLists.concat(extractIframeSrc(node)); //match iframe.src
             } else if (node.nodeName.toUpperCase( ) == 'FRAME') {
                 urlLists = urlLists.concat(extractFrameSrc(node)); //match frame.src
             } else if (node.nodeName.toUpperCase( ) == 'EMBED') {
                 urlLists = urlLists.concat(extractEmbedSrc(node)); //match embed.src
             } else if (node.nodeName.toUpperCase( ) == 'IMG') {
                 urlLists = urlLists.concat(extractImgSrc(node)); //match img.src
             } else if (node.nodeName.toUpperCase( ) == 'FORM') {
                 urlLists = urlLists.concat(extractFormAction(node)); //match form.action
             } else if (node.nodeName.toUpperCase( ) == 'LINK') {
                 urlLists = urlLists.concat(extractLinkHref(node)); //match link.href
              } else if (node.nodeName.toUpperCase( ) == 'STYLE') {
                 urlLists = urlLists.concat(extractStyleLabel(node)); //match innerHTML of style
             }
        if (node.nodeType == 1 && node.getAttribute('style')) {
                 urlLists = urlLists.concat(extractStyleInnerHtml(node)); //match style attribute of a node
             }
         }
         if (urlLists.length <= 0) {
           return false;
         }
         urlLists = distinctZyjArray(urlLists); //sorting and reduplication
         packZyjURLData(urlLists, parentMark, checkInfo); //send
     }
```

Next, whether the code is code used by illegal URLs is determined by using an example for description:

```
    function isAntiTxDOMain(sURL) {
         var sDOMain = extractZyjDOMain(sURL);
         var regTxCom = /(\.|^)(qq|paipai|soso|wenwen|tenpay)\.com$/i; //regular expressions of legal domain names
         if (regTxCom.test(sDOMain)) {
             return false;//if legal, return non-illegal domain names
         }
      if (whiteReg && whiteReg.test(sDOMain)) {
             return false;//if the access party sets a domain name whitelist and the website is in the whitelist, return non-illegal domain names
         }
         return true;
     }
```

After it is determined that the node includes the illegal URLs, that is, after the HTTP is hijacked, extracted code on which striking is performed is as shown below

```
    if (tagResult && tagResult.length > 0 && antiHijack) {
      node.setAttribute('style','display:none;position:fixed;top:10000px;'); //display of node is hidden
    }
```

The dynamically inserted DOM node is a newly inserted DOM node in the DOM tree, or the attribute of the original DOM node in the DOM tree, such as an attribute of an existing DOM node plus {background:url(http://xxx.png), is dynamically changed.

This embodiment provides a monitoring solution for preventing HTTP hijacking based on an HTML DOM event. For a manner of tampering with HTTP packet returning by an operator, web page changes are listened to. If an illegal URL is referenced to a web page, the HTTP of the web page is hijacked, and display of a hijacked part of the web page is hidden. Specifically, the client may listen to DOMNodeInserted, DOMContentLoaded, and DOMAttrModified event of the HTML, to filter out the illegal URLs, and hide DOM nodes with the illegal URLs. In this embodiment, when page loading is completed, DOM nodes of a DOM tree are traversed all at once, all illegal URLs are filtered out, and display of illegal DOM nodes are hidden and striking processing is performed. Page changes are listened to, and dynamically inserted DOM nodes or DOM node attributes are detected and stricken. In this embodiment, setting of a domain name whitelist is further supported, that is, whether the domain name whitelist is a filter list of illegal URLs, and the domain name whitelist supports application party custom, and is flexible. In this embodiment, the access to a website is simple, no participation of users is needed to prevent web page hijacking, and user experience is improved.

It should be noted that, for ease of description, the foregoing method embodiments are expressed as a series of actions. However, persons skilled in the art should appreciate that the disclosure is not limited to the described action sequence, because according to the disclosure, some operations may be performed in other sequences or performed simultaneously. In addition, a person skilled in the art should also understand that the embodiments described in this specification all belong to exemplary embodiments, and the involved actions and modules are not necessarily mandatory to the disclosure.

To better implement the foregoing solutions of the embodiments, related apparatuses used to implement the foregoing solutions are further provided below.

Figure 8A:
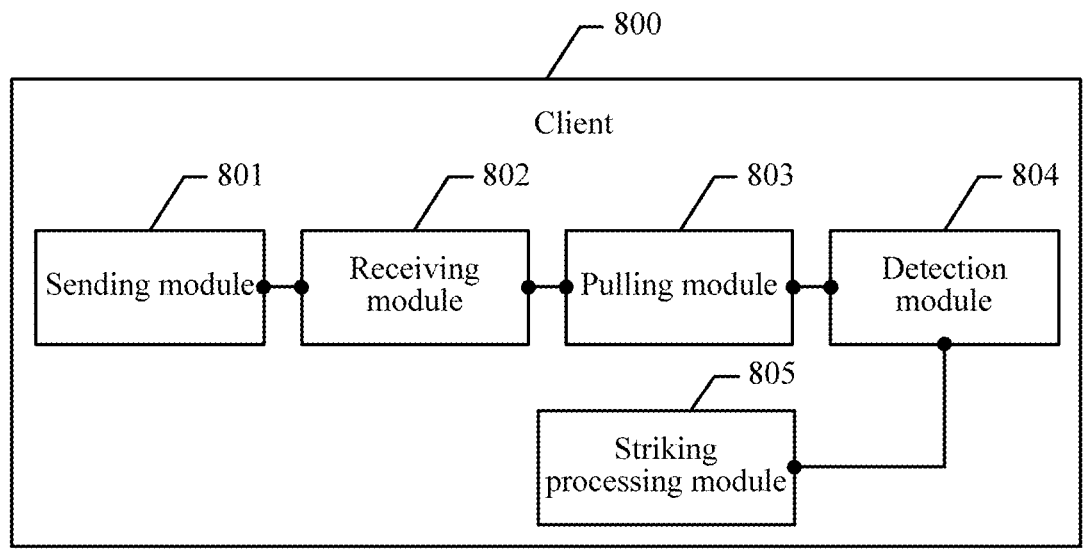
FIG. 8a is a schematic diagram of a composition structure of a client according to an embodiment.

Referring to FIG. 8a, a client 800 provided in an embodiment may include: a sending module 801, a receiving module 802, a pulling module 803, a detection module 804, and a striking processing module 805.

The sending module 801 is configured to send an HTTP access request to a web server.

The receiving module 802 is configured to receive an HTML source file returned by the web server, the HTML source file being embedded with a script tag corresponding to script code for preventing HTTP hijacking.

The pulling module 803 is configured to pull the script code for preventing HTTP hijacking from an antihijacking server according to the script tag.

The detection module 804 is configured to detect, by using the script code for preventing HTTP hijacking, whether a DOM node used for HTTP hijacking exists in a DOM tree.

The striking processing module 805 is configured to hide the DOM node used for HTTP hijacking from a web page of a browser if the DOM node used for HTTP hijacking exists.

In some embodiments, the sending module 801 is further configured to report hijacking information to the antihijacking server if the DOM node used for HTTP hijacking exists.

Figure 8B:
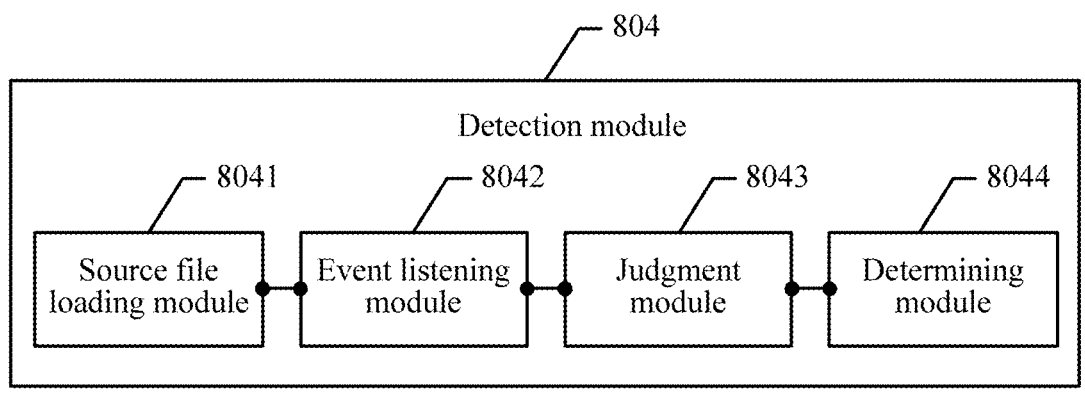
FIG. 8b is a schematic diagram of a composition structure of a client according to an embodiment.

In some embodiments, referring to FIG. 8b, the detection module 804 includes:

a source file loading module 8041, configured to load the HTML source file in the web page of the browser;

an event listening module 8042, configured to listen to the following DOM events by using the browser: a DOM node load completion event, a dynamic DOM node inserted event, and a dynamic DOM node attribute modified event;

a judgment module 8043, configured to determine, according to results of listening to the DOM events, whether DOM nodes in the DOM tree match a URL matching rule configured by the script code for preventing HTTP hijacking; and a determining module 8044, configured to determine a DOM node that does not match the URL matching rule as the DOM node used for HTTP hijacking.

In some embodiments, the script code for preventing HTTP hijacking further includes: a website whitelist.

The determining module 8043 is specifically configured to determine whether URLs included in all DOM nodes in the DOM tree match the URL matching rule configured by the script code for preventing HTTP hijacking, and determine whether the URLs included in all DOM nodes belong to the website whitelist.

The determining module 8044 is specifically configured to determine a DOM node whose URL does not match the URL matching rule and does not belong to the website whitelist as the DOM node used for HTTP hijacking.

In some embodiments, the script code for preventing HTTP hijacking further includes: an indication message used for indicating whether to strike the HTTP hijacking.

The striking processing module 805 is specifically configured to determine, in the script code for preventing HTTP hijacking, whether the HTTP hijacking needs to be stricken; and hide the DOM node used for HTTP hijacking from the web page of the browser when the indication message indicates that the HTTP hijacking needs to be stricken.

As can be learned from the examples by using the foregoing embodiments, a client first sends an HTTP access request to a web server, and the client receives an HTML source file returned by the web server, the HTML source file being embedded with a script tag corresponding to script code for preventing HTTP hijacking; the client then pulls the script code for preventing HTTP hijacking from an antihijacking server according to the script tag; the client detects, by using the script code for preventing HTTP hijacking, whether a DOM node used for HTTP hijacking exists in a DOM tree; and the client hides the DOM node used for HTTP hijacking from a web page of a browser if the DOM node used for HTTP hijacking exists. In this embodiment, when page loading is completed, DOM nodes in the DOM tree may be traversed, and s DOM node used for HTTP hijacking is hidden, thereby displaying normal content in web pages, and preventing web page hijacking.

Figure 9A:
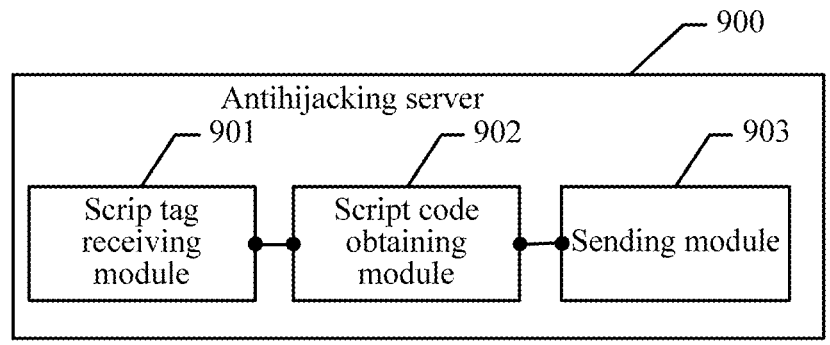
FIG. 9a is a schematic diagram of a composition structure of an antihijacking server according to an embodiment.

Referring to FIG. 9a, an antihijacking server 900 provided in an embodiment may include: a script tag receiving module 901, a script code obtaining module 902, and a sending module 903.

The script tag receiving module 901 is configured to receive a script tag that corresponds to script code for preventing HTTP hijacking and that is sent by a client, the script tag being embedded in an HTML source file.

The script code obtaining module 902 is configured to obtain the script code for preventing HTTP hijacking according to the script tag.

The sending module 903 is configured to return the script code for preventing HTTP hijacking to the client.

Figure 9B:
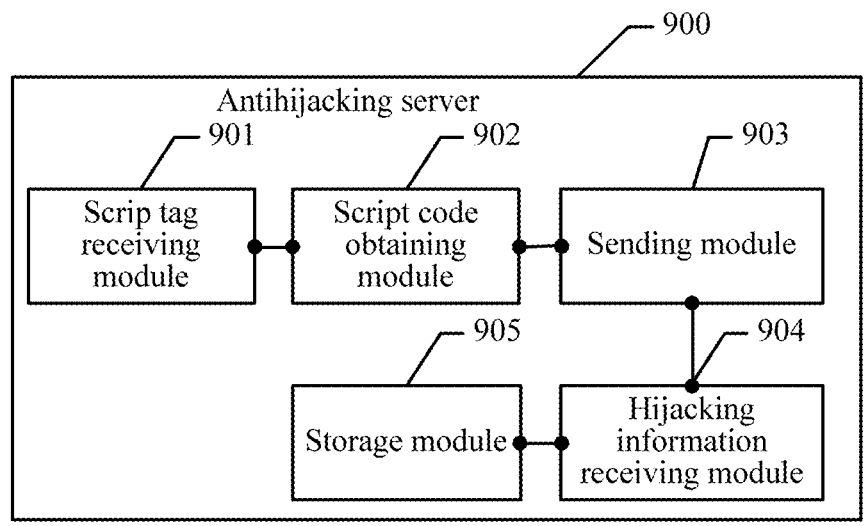
FIG. 9b is a schematic diagram of a composition structure of another antihijacking server according to an embodiment.

In some embodiments, referring to FIG. 9b, the antihijacking server 900 further includes:

a hijacking information receiving module 904, configured to receive hijacking information sent when the client detects the DOM node used for HTTP hijacking, after the sending module 901 returns the script code for preventing HTTP hijacking to the client; and a storage module 905, configured to store the hijacking information to a database.

Figure 9C:
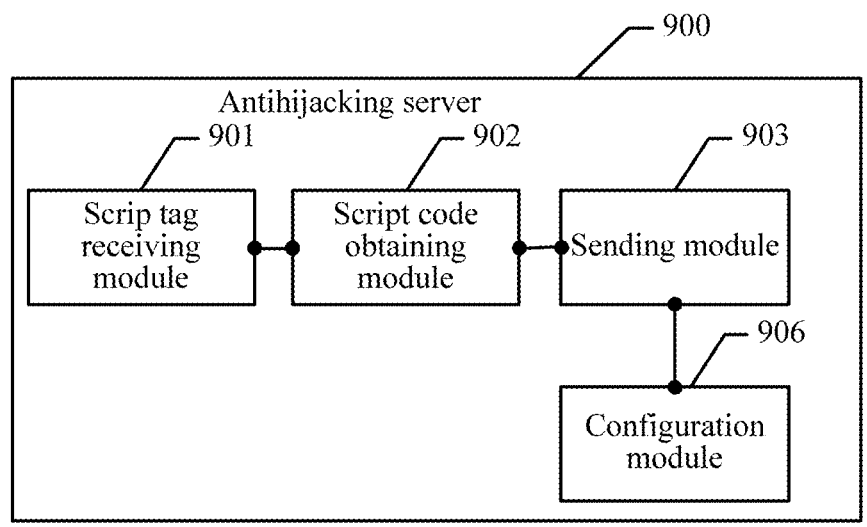
FIG. 9c is a schematic diagram of a composition structure of another antihijacking server according to an embodiment.

In some embodiments, referring to FIG. 9c, the antihijacking server 900 further includes:

a configuration module 906, configured to set a website whitelist in the script code for preventing HTTP hijacking; and/or set, in the script code for preventing HTTP hijacking, an indication message used for indicating whether to perform striking on the HTTP hijacking.

As can be learned from the examples by using the foregoing embodiments, a client pulls script code for preventing HTTP hijacking from an antihijacking server according to a script tag corresponding to the script code for preventing HTTP hijacking, and the antihijacking server may provide the script code for preventing HTTP hijacking to the client, so that when page loading is completed, is the client may use the script code for preventing HTTP hijacking to traverse DOM nodes in the DOM tree, and hide a DOM node used for HTTP hijacking, thereby displaying normal content on web pages, and preventing web page hijacking.

Figure 10A:
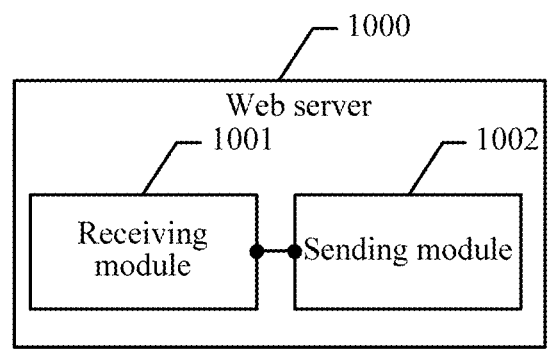
FIG. 10a is a schematic diagram of a composition structure of a web server according to an embodiment.

Referring to FIG. 10a, a web server 1000 provided in an embodiment may include: a receiving module 1001 and a sending module 1002.

The receiving module 1001 is configured to receive an HTTP access request sent by a client.

The sending module 1002 is configured to send an HTML source file to the client according to the HTTP access request, the HTML source file being embedded with a script tag corresponding to script code for preventing HTTP hijacking.

Figure 10B:
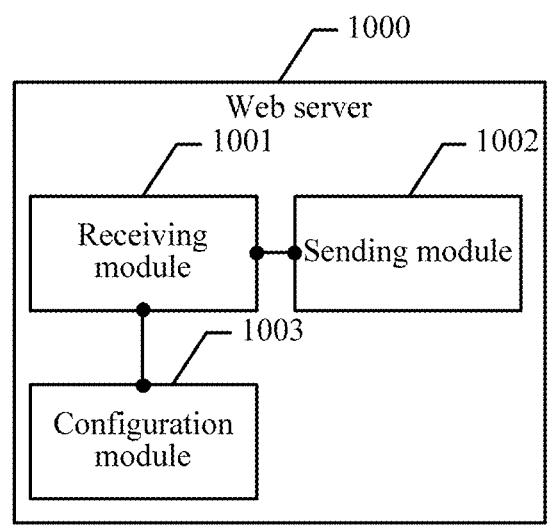
FIG. 10b is a schematic diagram of a composition structure of another web server according to an embodiment.

In some embodiments, referring to FIG. 10b, the web server 100 further includes: a configuration module 1003, configured to insert a script tag corresponding to the script code for preventing HTTP hijacking into an HTML source file before the receiving module 1001 receives the HTTP access request sent by the client.

As can be learned from the examples by using the foregoing embodiment, a client first sends an HTTP access request to a web server, and the client receives an HTML source file returned by a web server, the HTML source file being embedded with a script tag corresponding to script code for preventing HTTP hijacking. In this embodiment, the web server sends the HTML source file embedded with the script tag corresponding to the script code for preventing HTTP hijacking to the client, so that the client may pull the corresponding script code for preventing HTTP hijacking from an antihijacking server by using the script tag. When page loading is completed, the client may use the script code for preventing HTTP hijacking to traverse DOM nodes in a DOM tree, and hide a DOM node used for HTTP hijacking, thereby displaying normal content on web pages, and preventing web page hijacking.

Figure 11:
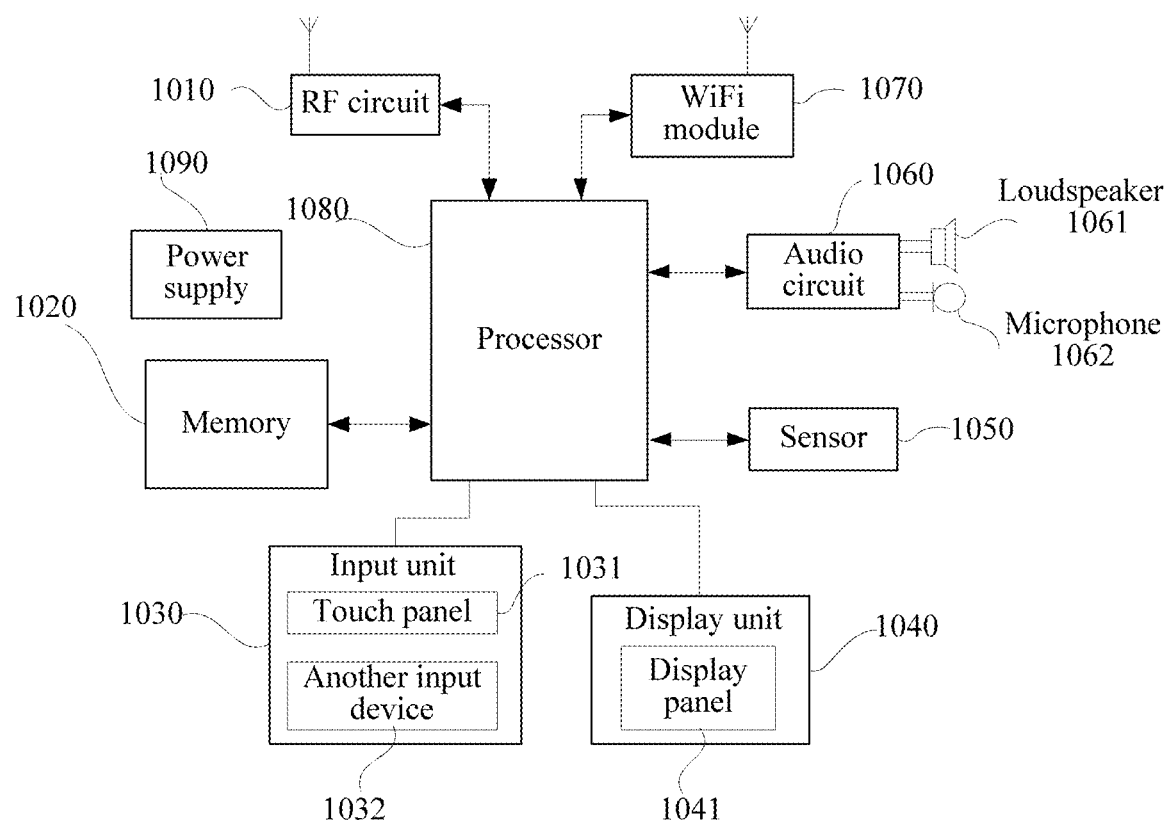
FIG. 11 is a schematic diagram of a composition structure of a terminal to which a method for preventing web page hijacking is applied according to an embodiment.

An embodiment further provides another terminal, as shown in FIG. 11, and for convenience of description, only parts related to the embodiment relevant are shown. For specific technical details that are not disclosed, refer to the method part of the embodiments. The terminal may be any terminal device including a mobile phone, a tablet computer, a Personal Digital Assistant (PDA), a Point of Sales (POS), and an on-board computer, and the terminal being a mobile phone is used as an example.

FIG. 11 is a block diagram of a structure of a part of a mobile phone related to a terminal according to an embodiment. Referring to FIG. 11, the mobile phone includes components such as a radio frequency (RF) circuit 1010, a memory 1020, an input unit (or an input interface or input circuitry) 1030, a display unit (or display) 1040, a sensor 1050, an audio circuit 1060, a wireless fidelity (WiFi) module 1070, a processor 1080, and a power supply 1090. A person skilled in the art may understand that the structure of the mobile phone shown in FIG. 11 does not constitute a limitation to the mobile phone, and the mobile phone may include more components or fewer components than those shown in the figure, or some components may be combined, or a different component deployment may be used.

The RF circuit 1010 may be configured to receive and send signals during an information receiving and sending process or a call process. Specifically, the RF circuit 1010 receives downlink information from a base station, then delivers the downlink information to the processor 1080 to be processed, and sends related uplink data to the base station. Generally, the RF circuit 1010 includes, for example but is not limited to, an antenna, at least one amplifier, a transceiver, a coupler, a low noise amplifier (LNA), and a duplexer. In addition, the RF circuit 1010 may also communicate with a network and another device through wireless communication. The wireless communication may use any communications standard or protocol, which includes, for example but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program to perform at least one function (such as a sound playback function and an image display function), and the like. The data storage area may store data (such as audio data and an address book) created according to use of the mobile phone, and the like. In addition, the memory 1020 may include a high-speed random access memory, and may further include a non-volatile memory such as at least one magnetic disk storage device or a flash memory device, or another volatile solid storage device.

The input unit 1030 may be configured to receive input digit or character information, and generate a keyboard signal input related to the user setting and function control of the mobile phone. Specifically, the input unit 1030 may include a touch panel 1031 and another input device 1032. The touch panel 1031, which may also be referred to as a touch screen, may collect a touch operation of a user on or near the touch panel (such as an operation of a user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. In addition, the touch controller can receive a command sent by the processor 1080 and execute the command. In addition, the touch panel 1031 may be a resistive, capacitive, infrared, or surface sound wave type touch panel. In addition to the touch panel 1031, the input unit 1030 may further include the another input device 1032. Specifically, the another input device 1032 may include, for example but is not limited to, one or more of a physical keyboard, a functional key (such as a volume control key or a switch key), a track ball, a mouse, and a joystick.

The display unit 1040 may be configured to display information input by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, to determine a type of a touch event. Then, the processor 1080 provides a corresponding visual output on the display panel 1041 according to the type of the touch event. Although, in FIG. 11, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of the motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1060, a loudspeaker 1061, and a microphone 1062 may provide audio interfaces between the user and the mobile phone. The audio circuit 1060 may convert received audio data into an electric signal and transmit the electric signal to the loudspeaker 1061. The loudspeaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another mobile phone by using the RF circuit 1010, or outputs the audio data to the memory 1020 for further processing.

WiFi is a short distance wireless transmission technology. The mobile phone may help, by using the WiFi module 1070, the user to receive and send e-mails, browse a web page, access streaming media, and so on, which provides wireless broadband Internet access for the user. Although FIG. 11 shows the WiFi module 1070, it may be understood that the WiFi module 1070 is not a necessary component of the mobile phone, and depending on an implementation, the WiFi module 1070 may be omitted as long as the scope of the essence of the disclosure is not changed.

The processor 1080 is the control center of the mobile phone, and is connected to various parts of the mobile phone by using various interfaces and lines. By running or executing the software program and/or module stored in the memory 1020, and invoking data stored in the memory 1020, the processor 1080 performs various functions and data processing of the mobile phone, thereby performing overall monitoring on the mobile phone. Optionally, the processor 1080 may include one or more processing units. In an embodiment, the processor 1080 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1080.

The mobile phone further includes the power supply 1090 (such as a battery) for supplying power to the components. In an embodiment, the power supply may be logically connected to the processor 1080 by using a power management system, thereby implementing functions such as charging, discharging and power consumption management by using the power management system.

Although not shown in the figure, the mobile phone may further include a camera, a Bluetooth module, and the like, which are not further described herein.

In this embodiment, the processor 1080 included in the terminal further controls to perform the foregoing method processes performed by a terminal.

Figure 12:
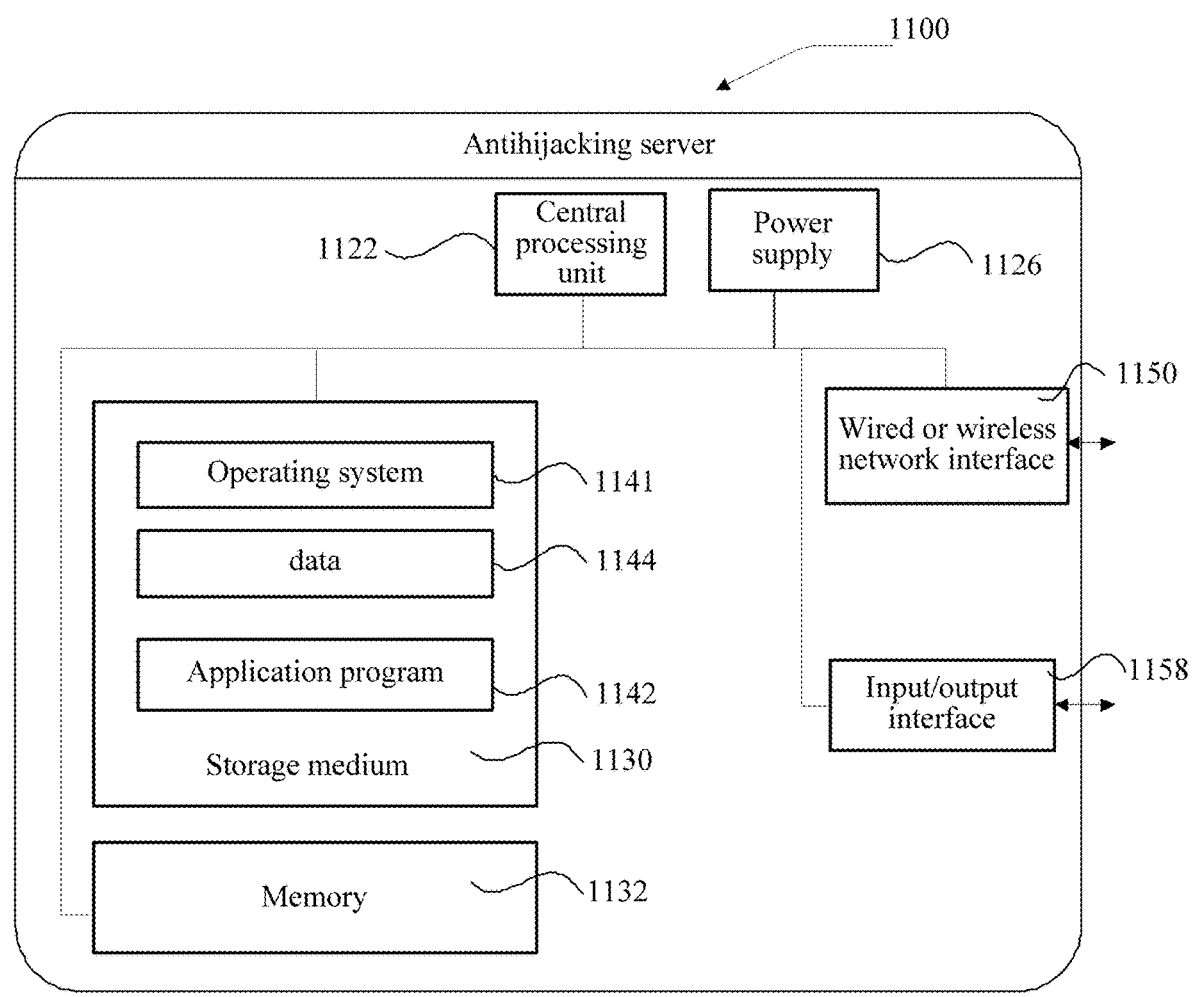
FIG. 12 is a schematic diagram of a composition structure of an antihijacking server to which a method for preventing web page hijacking is applied according to an embodiment.

FIG. 12 is a schematic structural diagram of an antihijacking server according to an embodiment. The server 1100 may vary greatly due to different configurations or performance, and may include one or more central processing units (CPU) 1122 (for example, one or more processors) and a memory 1132, and one or more storage media 1130 (for example, one or more mass storage devices) that store an application program 1142 or data 1144. The memory 1132 and the storage medium 1130 may be transient storages or persistent storages. The program stored in the storage medium 1130 may include one or more modules (which is not marked in the figure), and each module may include a series of instruction and operations to the server. Still further, the CPU 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, and FreeBSD™.

The operations performed by the antihijacking server in the foregoing embodiments may be based on the server structure shown in FIG. 12.

Figure 13:
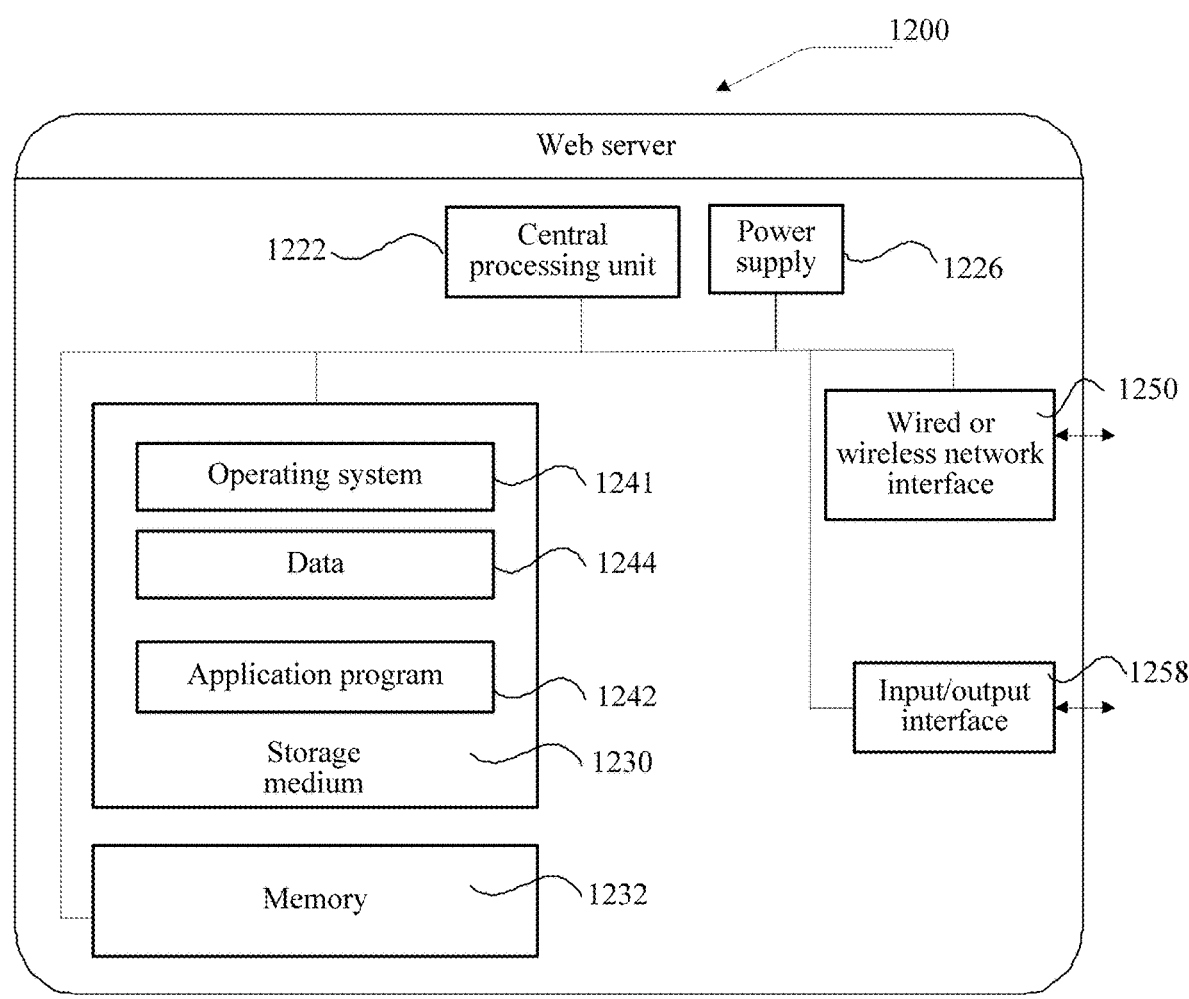
FIG. 13 is a schematic diagram of a composition structure of a web server to which a method for preventing web page hijacking is applied according to an embodiment.

FIG. 13 is a schematic structural diagram of a web server according to an embodiment. The server 1200 may vary greatly due to different configurations or performance, and may include one or more central processing units (CPU) 1222 (for example, one or more processors) and a memory 1232, and one or more storage media 1230 (for example, one or more mass storage devices) that store an application program 1242 or data 1244. The memory 1232 and the storage medium 1230 may be transient storages or persistent storages. The program stored in the storage medium 1230 may include one or more modules (which is not marked in the figure), and each module may include a series of instruction and operations to the server. Still further, the CPU 1222 may be configured to communicate with the storage medium 1230, and perform, on the server 1200, a series of instructions and operations in the storage medium 1230.

The server 1200 may further include one or more power supplies 1226, one or more wired or wireless network interfaces 1250, one or more input/output interfaces 1258, and/or one or more operating systems 1241, for example, Windows Server™, Mac OS X™, Unix™, Linux™, and FreeBSD™.

The operations performed by the antihijacking server in the foregoing embodiments may be based on the server structure shown in FIG. 13.

In addition, an embodiment further provides a storage medium. The storage medium is used for storing program code, and the program code is used for performing the method for preventing web page hijacking provided in the foregoing embodiments.

An embodiment further provides a computer program product including instructions. The computer program product, when run in a server, causes the server to perform the method for preventing web page hijacking provided in the foregoing embodiments.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all modules thereof may be selected based on an actual requirement, to implement an objective of the solution in this embodiment. In addition, in the accompanying drawings of the apparatus embodiments provided by the disclosure, connection relationships between modules indicate that the modules have communication connections with each other, which may be specifically implemented as one or more communications buses or signal cables. A person of ordinary skill in the art may understand and implement the objective without creative efforts.

Based on the descriptions of the foregoing implementations, persons skilled in the art may clearly understand that the disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. In the disclosure, software program implementation may be widely adopted. Based on such an understanding, the technical solutions of the disclosure essentially or the part contributing to the related art technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments.

In example embodiments, a client first sends an HTTP access request to a web server, and the client receives an HTML source file returned by the web server, the HTML source file being embedded with a script tag corresponding to script code for preventing HTTP hijacking; the client then pulls the script code for preventing HTTP hijacking from an antihijacking server according to the script tag; the client detects, by using the script code for preventing HTTP hijacking, whether a DOM node used for HTTP hijacking exists in a DOM tree; and the client hides the DOM node used for HTTP hijacking from a web page of a browser if the DOM node used for HTTP hijacking exists. In the example embodiments, when page loading is completed, DOM nodes in the DOM tree may be traversed, and a DOM node used for HTTP hijacking is hidden, thereby displaying normal content in web pages, and preventing web page hijacking.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method for preventing hijacking of a web page, the method comprising:
    receiving, by a client, a HyperText Markup Language (HTML) source file from a web server in response to a HyperText Transfer Protocol (HTTP) access request, the HTML source file being embedded with a script tag corresponding to script code for preventing HTTP hijacking;
    pulling, by the client, the script code for preventing HTTP hijacking from an antihijacking server according to the script tag;
    loading, by the client, the HTML source file in the web page of a browser;
    monitoring, by the client, a change to the web page and determining, according to changed document object model (DOM) nodes and a URL matching rule configured by the script code for preventing HTTP hijacking, whether a DOM node used for HTTP hijacking exists in a DOM tree; and
    hiding, by the client, the DOM node used for HTTP hijacking from the web page of the browser in response to detecting that the DOM node used for HTTP hijacking exists.

2. The method according to claim 1, further comprising:
    reporting, by the client, hijacking information to the antihijacking server in response to detecting that the DOM node used for HTTP hijacking exists.

3. The method according to claim 1, wherein the monitoring comprises:
    listening, by the client, to a DOM event by using the browser, the DOM event comprising at least one of a DOM node load completion event, a dynamic DOM node inserted event, or a dynamic DOM node attribute modified event, and wherein the determining comprises:
  determining, by the client based on a result of listening to the DOM event, whether DOM nodes in the DOM tree match the URL matching rule; and
  determining, by the client, a DOM node that does not match the URL matching rule as the DOM node used for HTTP hijacking.

4. The method according to claim 3, wherein the script code for preventing HTTP hijacking comprises a website whitelist,
  the determining whether the DOM nodes in the DOM tree match the URL matching rule comprises:
  determining, by the client, whether URLs included in all DOM nodes in the DOM tree match the URL matching rule configured by the script code for preventing HTTP hijacking, and determining whether the URLs included in all DOM nodes belong to the website whitelist, and
  the determining the DOM node that does not match the URL matching rule as the DOM node used for HTTP hijacking comprises:
  determining, by the client, a DOM node whose URL does not match the URL matching rule and does not belong to the website whitelist as the DOM node used for HTTP hijacking.

5. The method according to claim 1, wherein the script code for preventing HTTP hijacking comprises an indication message used for indicating whether to strike the HTTP hijacking, and
  the hiding comprises:
  hiding, by the client, the DOM node used for HTTP hijacking from the web page of the browser in response to the indication message indicating that the HTTP hijacking is to be stricken.

6. A client, comprising:
  at least one memory operable to store program code; and
  at least one processor operable to read the program code and operate as instructed by the program code, the program code comprising:
  receiving code configured to cause the at least one processor to receive an HTML a HyperText Markup Language (HTML) source file from a web server in response to a HyperText Transfer Protocol (HTTP) access request, the HTML source file being embedded with a script tag corresponding to script code for preventing HTTP hijacking;
  pulling code configured to cause the at least one processor to pull the script code for preventing HTTP hijacking from an antihijacking server according to the script tag;
  source file loading code configured to cause the at least one processor to load the HTML source file in a web page of a browser;
  detection code configured to cause the at least one processor to monitor a change to the web page and detect, according to changed document object model (DOM) nodes and a URL matching rule configured by the script code for preventing HTTP hijacking, whether a DOM node used for HTTP hijacking exists in a DOM tree; and
  striking processing code configured to cause the at least one processor to hide the DOM node used for HTTP hijacking from the a-web page of a-the browser in response to detecting that the DOM node used for HTTP hijacking exists.

7. The client according to claim 6, wherein the detection code comprises:
  event listening code configured to cause the at least one processor to listen to a DOM event by using the browser, the DOM event comprising at least one of: a DOM node load completion event, a dynamic DOM node inserted event, or a dynamic DOM node attribute modified event;
  judgment code configured to cause the at least one processor to determine, based on a result of listening to the DOM event, whether DOM nodes in the DOM tree match a a Uniform Resource Locator (URL) matching rule configured by the script code for preventing HTTP hijacking; and
  determining code configured to cause the at least one processor to determine a DOM node that does not match the URL matching rule as the DOM node used for HTTP hijacking.

8. The client according to claim 7, wherein the script code for preventing HTTP hijacking comprises a website whitelist,
  the determining code causes the at least one processor to determine whether URLs included in all DOM nodes in the DOM tree match the URL matching rule configured by the script code for preventing HTTP hijacking, and determine whether the URLs included in all DOM nodes belong to the website whitelist; and
  the determining code causes the at least one processor to determine a DOM node whose URL does not match the URL matching rule and does not belong to the website whitelist as the DOM node used for HTTP hijacking.

9. The client according to claim 6, wherein the script code for preventing HTTP hijacking comprises an indication message used for indicating whether to strike the HTTP hijacking; and
  the striking processing code causes the at least one processor to hide the DOM node used for HTTP hijacking from the web page of the browser in response to the indication message indicating that the HTTP hijacking is to be stricken.

10. A non-transitory storage medium, storing program code that is executed by at least one processor to perform:
  receiving a HyperText Markup Language (HTML) source file from a web server in response to a HyperText Transfer Protocol (HTTP) access request, the HTML source file being embedded with a script tag corresponding to script code for preventing HTTP hijacking;
  pulling the script code for preventing HTTP hijacking from an antihijacking server according to the script tag;
  loading the HTML source file in a web page of a browser;
  monitoring a change to the web page and determining, according to changed document object model (DOM) nodes and a URL matching rule configured by the script code for preventing HTTP hijacking, whether a DOM node used for HTTP hijacking exists in a DOM tree; and
  hiding the DOM node used for HTTP hijacking from the web page of the browser in response to detecting that the DOM node used for HTTP hijacking exists.

* * * * *